US007814424B2

(12) United States Patent
Shilo

(10) Patent No.: US 7,814,424 B2
(45) Date of Patent: Oct. 12, 2010

(54) WEBPAGE-FLAGS SENSITIVE TOOLBAR

(76) Inventor: Ronen Shilo, Hagoren 11, Gedera (IL)

( * ) Notice: Subject to any disclaimer, the term of this patent is extended or adjusted under 35 U.S.C. 154(b) by 648 days.

(21) Appl. No.: 11/823,144

(22) Filed: Jun. 26, 2007

(65) Prior Publication Data

US 2009/0007013 A1    Jan. 1, 2009

(51) Int. Cl.
*G06F 3/00*    (2006.01)
*G06F 3/048*    (2006.01)

(52) U.S. Cl. .................... 715/744; 715/779; 715/866; 715/826; 715/765

(58) Field of Classification Search ............... 715/779, 715/765, 744, 866, 826, 825
See application file for complete search history.

(56) References Cited

U.S. PATENT DOCUMENTS

| | | | | |
|---|---|---|---|---|
| 6,020,884 | A * | 2/2000 | MacNaughton et al. | 715/747 |
| 6,133,915 | A * | 10/2000 | Arcuri et al. | 715/779 |
| 6,266,058 | B1 * | 7/2001 | Meyer | 715/733 |
| 6,282,548 | B1 * | 8/2001 | Burner et al. | 707/104.1 |
| 6,292,185 | B1 * | 9/2001 | Ko et al. | 715/763 |
| 6,496,203 | B1 * | 12/2002 | Beaumont et al. | 715/762 |
| 6,784,900 | B1 * | 8/2004 | Dobronsky et al. | 715/744 |
| 6,819,343 | B1 * | 11/2004 | Sobeski et al. | 715/848 |
| 6,934,697 | B1 * | 8/2005 | Warren | 707/1 |
| 7,058,892 | B1 * | 6/2006 | MacNaughton et al. | 715/738 |
| 7,107,548 | B2 * | 9/2006 | Shafron | 715/826 |
| 7,136,896 | B1 * | 11/2006 | Srinivas et al. | 709/203 |
| 7,222,303 | B2 * | 5/2007 | Oren et al. | 715/744 |
| 7,293,072 | B2 * | 11/2007 | Blegen et al. | 709/217 |
| 7,328,405 | B1 * | 2/2008 | Hyatt et al. | 715/738 |
| 7,373,313 | B1 * | 5/2008 | Kahle et al. | 705/26 |
| 7,373,610 | B2 * | 5/2008 | Nakamura | 715/765 |
| 7,412,655 | B2 * | 8/2008 | Wada et al. | 715/744 |
| 7,506,260 | B2 * | 3/2009 | Wada et al. | 715/738 |
| 7,529,766 | B2 * | 5/2009 | Shilo et al. | 707/102 |
| 7,539,933 | B2 * | 5/2009 | Brown et al. | 715/207 |
| 2001/0029527 | A1 * | 10/2001 | Goshen | 709/218 |
| 2002/0057299 | A1 * | 5/2002 | Oren et al. | 345/825 |
| 2002/0186255 | A1 * | 12/2002 | Shafron et al. | 345/810 |
| 2003/0080995 | A1 * | 5/2003 | Tenenbaum et al. | 345/738 |
| 2003/0202009 | A1 * | 10/2003 | Kasriel | 345/739 |
| 2004/0061720 | A1 * | 4/2004 | Weber | 345/760 |

(Continued)

OTHER PUBLICATIONS

RSS Autodiscovery, Nov. 27, 2006, www.rssboard.org.*

(Continued)

*Primary Examiner*—Tadesse Hailu
*Assistant Examiner*—Nicholas S Ulrich
(74) *Attorney, Agent, or Firm*—Henry Brendzel

(57) ABSTRACT

A browser add-on toolbar that offers users to collect toolbars from visited webpages that offer such toolbars and which, later, the user may select any one of the collected toolbars to become the current toolbar that the browser provides to the user. These abilities are imparted by having the toolbar be sensitive to one or more particular flags in visited pages. When a browser that contains this toolbar visits a website, the browser parses and searches the visited website page for presence of one or more of the particular flags, and when such a flag is found, the user is given a visual indication of the find and is given the choice to include within the browser's toolbar the ability to instantiate a toolbar based on information associated with the flag.

21 Claims, 2 Drawing Sheets

U.S. PATENT DOCUMENTS

| | | | |
|---|---|---|---|
| 2004/0186775 A1* | 9/2004 | Margiloff et al. | 705/14 |
| 2006/0036966 A1* | 2/2006 | Yevdayev | 715/779 |
| 2006/0123356 A1* | 6/2006 | Sobeski et al. | 715/781 |
| 2007/0022202 A1* | 1/2007 | Finkle et al. | 709/227 |
| 2007/0043583 A1* | 2/2007 | Davulcu et al. | 705/1 |
| 2007/0225047 A1* | 9/2007 | Bakos | 455/566 |
| 2008/0195495 A1* | 8/2008 | Rubin et al. | 705/14 |

OTHER PUBLICATIONS

Freitas, Internet Explorer 7 and RSS feeds, Oct. 20, 2006, www.geekzone.co.nz.*

* cited by examiner

WEBPAGE-FLAGS SENSITIVE TOOLBAR

FIELD OF THE INVENTION

The present invention relates to a system for use with the Internet and, more particularly relates to browser toolbars

BACKGROUND OF THE INVENTION

Personal computers typically include one or more browser programs that enable a computer to interact with web sites that are accessible via the Internet. Current day browsers include software modules that are included with the browser initially, or added to the browser at a later time through an updating process that is initiated by the user but otherwise is automatic. Modules that are added to the browser are typically referred to as browser add-ons, and one category of browser add-ons is a toolbar.

A toolbar is a software module that presents itself to a user as a block of onscreen buttons, icons and/or some other visual elements, such as text. Toolbars often include a text box that, when a button or icon is clicked, activates certain functions of the module and forwards the inserted text over the Internet. Some toolbars are defined by the programmer, and have set functions. Others allow the end user to modify and customize the toolbars to fit the user's personal needs. Typically, the toolbar provides one of more functionality that is not provided by the browser. The basic construction of a toolbar is well known in the art and is, therefore, not described herein.

One such toolbar is disclosed in US Patent Application 2006/0179060. It describes a toolbar that is customized to include a set of functions and, more particularly, it describes a toolbar that is created by a hosting service to have functionalities that are made specific to the needs of different website owners, creating a relationship between the hosting service and many different website owners, and allowing the website owners to obtain the benefits of the toolbar, and any enhancement thereof, without needing to worry about toolbar designs. One of the benefits of the inventions disclosed in the aforementioned application is that a website owner needs to only specify the particularization, or customization, information to a browser in order for the browser to effectively have a toolbar that is customized to the website owner, including defining a specific look-and-feel as well as functionalities of the browser add-on toolbar. In other words, an instantiated version of the toolbar that had been created by the toolbar creator is fashioned.

SUMMARY OF THE INVENTION

Another advance in the art is achieved with a browser toolbar that is webpage-flag sensitive (WFS toolbar, for short), and more particularly, adapted to accumulate toolbar variations following discovery of webpage flags. Illustratively, the toolbar is adapted to automatically detect and identify particular flags in visited websites, and pursuant to a directive from the user download toolbars instantiations that are represented by the detected flags. The downloaded information enables a user to later swap between the various downloaded toolbar instantiations; in effect morphing from one toolbar to a different toolbar. The automatic detection of the flags is accomplished by the toolbar parsing each visited webpages and searching the parsed information for presence of one or more of the particular flags to which the toolbar is sensitive. When such a flag is found, the user is given a visual indication of the find and is given the opportunity to include within the toolbar the ability to instantiate a toolbar based on information associated with the flag.

In one illustrative embodiment, the flag is a domain name that is found in a list of domain names that is obtained by the toolbar, on a regular basis, from a dedicated server.

DETAILED DESCRIPTION

Figure 1:
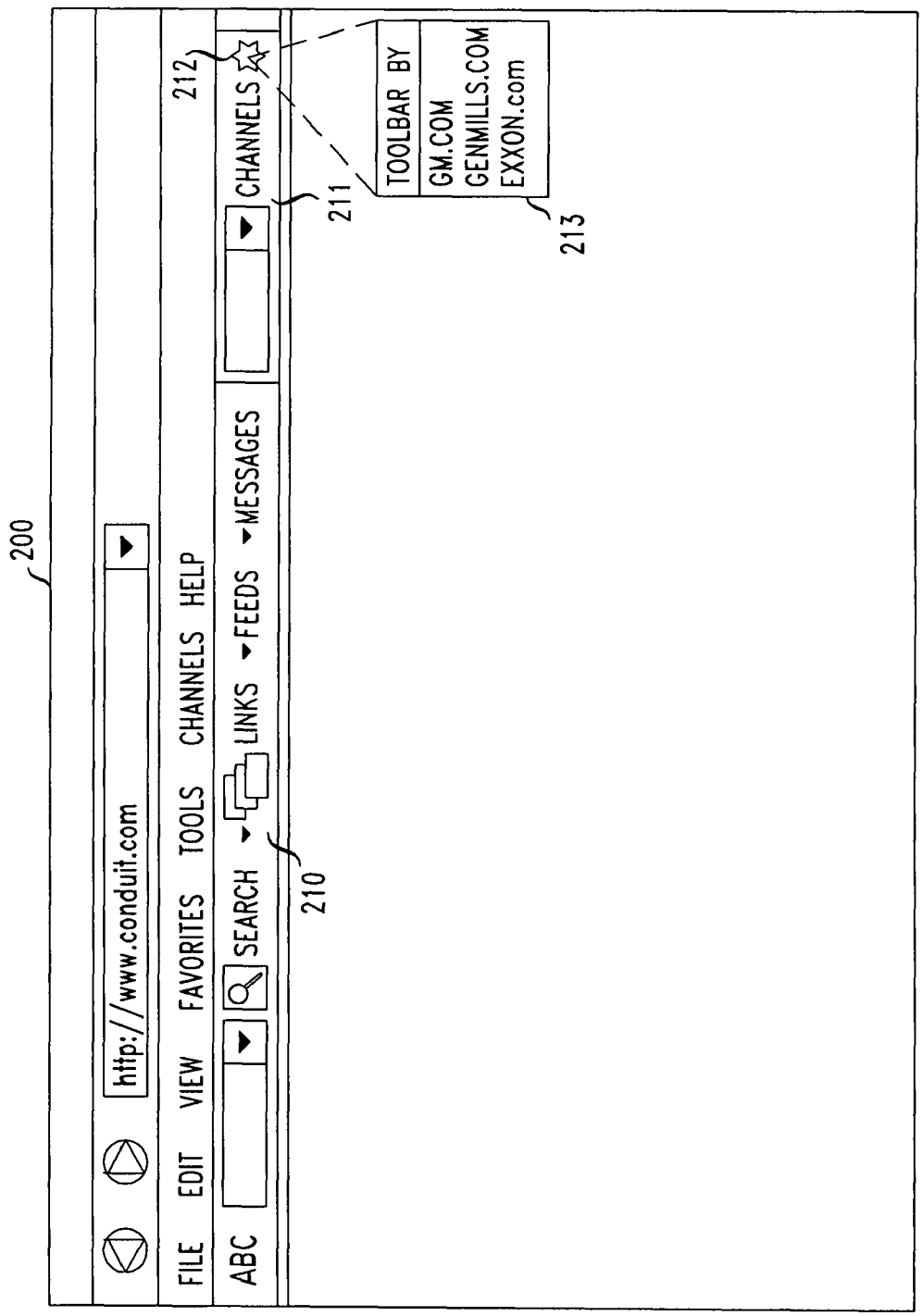
FIG. 1 presents a webpage presented by a browser that includes a toolbar in accord with the principles disclosed herein (WFS toolbar)

FIG. 1 presents a webpage 200 (with blank content to simplify the illustration) which is presented by a browser that includes a WFS toolbar 210 in accord with the principles disclosed herein. Broadly speaking, toolbar 210 is constructed with the capability to find specific flags in normally visited webpages, and the ability to obtain and install parameter information relative to the found flags, which information morphs the existing toolbar into a toolbar with potentially a different look-and-feel and different functionalities.

When such flags are found, the toolbar offers the user that employs the associated browser the option to install parameters relative to the found information, and at any time thereafter the user may select any one of the collected parameter sets to become the current parameter set that effectively specifies the toolbar that the browser presents to the user.

In the illustrative embodiment disclosed in detail herein, the specific flags are domain names (typically, a substring of a URL) that are found in visited webpages and are also found in a list possessed by the toolbar and which at times is updated. These domains are chosen by the party from whence the list originates (the server) and, illustratively, the URL is also where parameters that are needed for the offered toolbar. More particularly, the server has a number of different toolbars that are offered to customers. When the customer creates the customer's toolbar, the server offers the customer a list of domain names (each corresponding to a particular kind of toolbar) from which the customer chooses one that fits the customer's needs. When a domain name is chosen, the customer gets a unique URL (organizationally below, or subsumed by, the domain name).

A skilled artisan would realize that the domain name flag is but one example, and that the kernel of the idea is the provision of an invitation to acquire a toolbar. This invitation is characterized by a flag, which advantageously is unique (though it doesn't have to be) and data that characterizes the particular toolbar, such as with the location where parameters for the toolbar can be found, or with the parameters themselves. Thus, the invitation comprises a flag and associated data which, at times, can be coalesced into the flag. The data may be an address of where the toolbar's specifying parameters are located, or information that leads to identifying such an address. Thus, illustratively, the invitation consist of:

(a) A flag that is one of a list of flags supplied by the server, and
  (1) associated address-specifying data that is part of the flag,
  (2) associated address-specifying data that is distinct from the flag, (3) associated data that specifies the parameters themselves; or (b) A flag that is a unique element (or a number of elements from a fixed list), and
  (1) associated address-specifying data that is part of the flag,
  (2) associated address-specifying data that is distinct from the flag,
  (3) associated data that specifies the parameters themselves.

Figure 2:
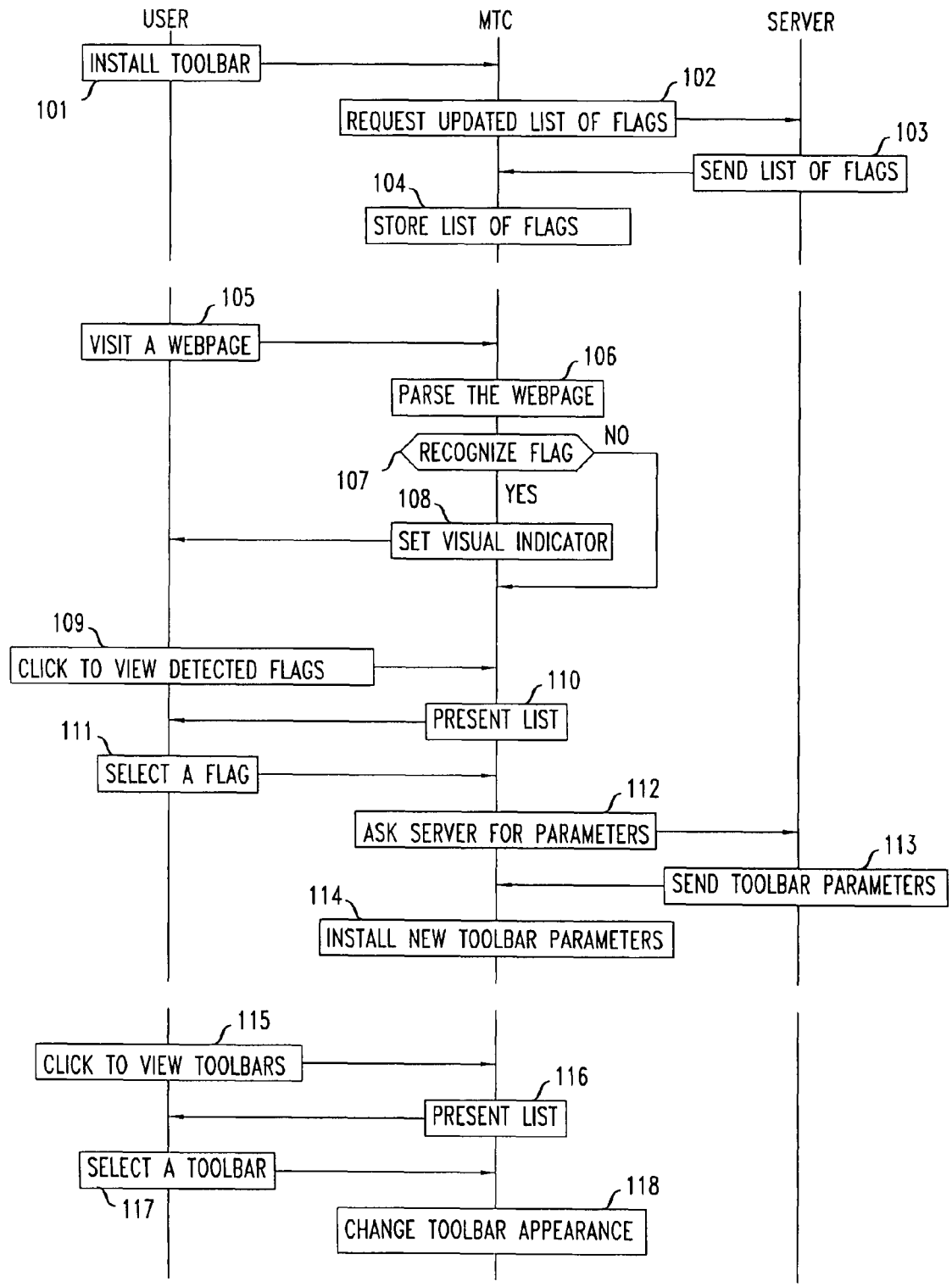
FIG. 2 presents a flowchart/timing diagram that depicts the actions of a user, a WFS toolbar, and a remote server in an illustrative example in accord with the principles disclosed herein.

FIG. 2 is a flowchart/timing diagram of embodiment (a) above, and it shows actions taken by user, a WFS toolbar, and a remote server. It starts with the user installing toolbar 210 into the user's browser at block 101. After the toolbar is installed, it requests an updated list of flags from a pre-designated server, for example, domain names (block 102). The server responds (block 103) with the requested information, and that information is stored in the toolbar (block 104). This phase of operation effectively establishes the toolbar with a repository of flags which, if and when one of the flags in the list is found in a visited webpage, the toolbar can obtain related toolbar parameters, and that allows a user to later instantiate a toolbar in accord with the obtained parameters.

To explain the need for the list in the disclosed embodiment, a server provides toolbar parameters for a group of website owners where each of them wishes to offer users a toolbar that is customized to them. It is basically a hosting service. The server provides a toolbar with a look-and-feel and functionalities that are controlled by a set of parameters, and this is the toolbar (210) that is downloaded to the user's browser. The list that the server maintains comprises the website owners (customers of the hosting service) that wish to offer users the ability to use the downloaded toolbar in a manner that is customized to them, and to that end the server maintains parameters associated with each of its customers. The list of customers is not very long, and transmitting that list to the toolbar obviates the need to communicate to the server each and every flag that toolbar 210 may find in visited webpages. In an embodiment where the flags are domain names, the list is even shorter. Therefore, in this illustrative embodiment, the toolbar is provided with a list that corresponds, effectively, to the hosting service customers; and advantageously this list consists of the domain names that the website owner customers will insert into their webpages.

It is expected that the list of hosting service customers and/or the flags themselves will change from time to time and, therefore, pursuant to some preselected algorithm, for example, whenever the browser program is initially executed, or periodically (e.g., once a week), the toolbar re-executes the cycle of requesting a list of flags, the server responding with a list, and the toolbar storing the list (blocks 102, 103 and 104) to replace the previous list. In the embodiment where the flags are domain names, It may be noted that the number of domain names may be smaller than the number of hosting service customers. For example, domain name mediatoolbar.com may support a number of different URLs (for example, a.mediatoolbar.com, b.mediatoolbar.com, etc.)

It is further expected that some time after installation, the user will cause the browser to access a webpage (block 105) that is offered by a website owner that is a customer of the hosting service, and that webpage might include one or several flags (in the present embodiment: domain names) that are found in the list obtained by the WFS toolbar. In accord with the principles disclosed herein, every time the browser receives a new webpage, the WFS toolbar parses the page (block 106) and ascertains whether the page includes any responsive flags. A responsive flag is a flag that is included in the aforementioned list, but is not a flag that correspond to a toolbar whose parameters had been previously downloaded to the toolbar. If a responsive flag is found, a visual indication is provided (block 108) to the user, such as a blinking star icon 212 in FIG. 1 that is included in the WFS toolbar and which, when blinking, invites the user to click on the icon.

It is still further expected that the user might indeed click on icon 212 (block 109) and, in response, the WFS toolbar presents a list (block 110) of whatever number of responsive flags that were detected (see list 213 in FIG. 1). That list consists of information, such as a text label that names the toolbars associated with the found flags. This information is derived from the found in the webpage in association with the flags, or from what is already available to the WFS toolbar. In some embodiments, more than just the name of the toolbar is displayed. While some of the above is couched in terms of flags, in the plural, it is expected that a webpage will have at most one flag of the type detected by the WFS toolbar. In such a case, information about only the one found flag is displayed.

The user may choose (block 111) to accept the effective invitation to add to the user's WFS toolbar instantiation capabilities (i.e., accept the offered toolbar), and this acceptance causes the WFS toolbar to request parameter information that pertains to the selected flag(s). In this disclosed embodiment, the request (block 112) is directed to the server. The server sends back the requested information (block 113) and the WFS toolbar installs the received toolbar parameters, and adds information about the newly installed parameters to its list of available toolbars (block 114) That is, the WFS toolbar installs the parameters, so that later they can be used to create a toolbar according to those parameters.

Numerous different ways may be used to store and organize the information received from the server. Illustratively, each set of parameters is a multi-field line in a file, where one of the fields is a label that is used in forming the above-mentioned list and displaying of the available toolbars, and the other fields are the parameters that control the look-and-feel, and the functionalities of the toolbar.

At a later time, the user might wish to morph the WFS toolbar from its then-present version to the version of a different toolbar. To execute on this wish, the user clicks on a preselected portion of the toolbar (block 115), for example on the down-arrow associated with the listbox within WFS toolbar 211, and is given a labels listing of the available toolbars (block 116). When the user selects a toolbar (block 117)—presumably one that is different from the present toolbar—the WFS toolbar changes its look-and-feel and/or its functionalities (block 118) according to the associated parameters that had been earlier send to the toolbar. It may be noted that when the user click to obtain a listing in the listbox, the option for the user to select one of the toolbars is but one of the choices. Other choices, such as removing a toolbar from the listing, changing the location of a toolbar in the list (more popular in higher place etc.) are some of the other choices.

The above disclosed a specific embodiment of the principles disclosed herein, and outlined a number of alternative embodiments, but as explicitly stated, the recited list of alternative embodiments was not exhaustive, and a skilled artisan would realize that other embodiments are possible without departing from the spirit and scope of this invention. Moreover, embodiments that differ in other aspects are also possible. For example, it is possible for a website owner to wish to modify the toolbar that it presents to customers, and desire to provide this modified toolbar not only to new customers, but also customers who previously downloaded the parameters of the website owner's toolbar. This desire is fulfilled by the hosting server sending the update list as above, but modified to include a special "update" marker (and some remarks) associated with a flag that is being modified. Illustratively, when a WFS toolbar receives the update list and notes that one of the flags for which it had previously downloaded the parameter set has an associated marker, it alerts the user, for example, via element 212. This alert may take place independently of the particular instantiation of the toolbar. Alternatively whenever the WFS toolbar receives an updated list, it compares the received list to the one in its memory, and similarly notifies the user for any changes. A user that notices the alert and requests the particulars is provided with the remarks that are included in the update list in association with that marker, and that allows the user to choose whether to have the new set of parameters downloaded, or not (in a manner not unlike steps 115-118).

The invention claimed is:

1. A web browser product that is stored in a computer readable medium and executed in a computer device with which said medium is associated, said browser including a communication module that enables said computer to interact via the Internet with remote devices, and a toolbar having a look-and-feel and a set of functionalities, the improvement comprising:
   a first module associated with the toolbar that
      provides a visual indication to a user of said browser when a webpage visited by the browser contains one or more preselected flags; and
      enables a user to download parameters relative to a selected one of said one or more visually indicated flags, which parameters enable said toolbar to be morphed into a toolbar with a look-and-feel and functionalities dictated by said parameters.

2. The browser of claim 1 further comprising:
   a second module associated with the toolbar that is adapted to
      present to said user a list available instantiations of said toolbar, each available instantiation corresponding to parameters that were previously downloaded;
      enable said user to select one of said available instantiations; and
      morph said toolbar based on selection made by said user.

3. The browser of claim 1 where said first module downloads and stores the parameters from a pre-specified server, from a server specified by the visited page, or from the visited page.

4. The browser of claim 1 where said first module parses a visited webpage to identify therein presence of one or more of said preselected-flags.

5. The browser of claim 1 further comprising a third module that is adapted to
   receive a current list of said preselected flags that contains one or more members from a server; and
   store at least a portion of said current list.

6. The browser of claim 5 where the third module is adapted to receive and store said list substantially periodically, or each time the browser's execution is initiated.

7. The browser of claim 5 where said list includes an update marker associated with at least one flag in said list.

8. The browser of claim 5 where said third module is further adapted to enable said user to request that said current list be sent.

9. The browser of claim 5 where the third module is further adapted to request, receive, and store said list pursuant to a preselected algorithm.

10. The browser of claim 5 where said preselected flags are webpage elements.

11. The browser of claim 4 where said preselected-flags are domain names.

12. A method executed by a toolbar installed in a browser product that is resident in computer device that includes a display monitor, comprising the steps of:
   said toolbar becoming aware that said browser received a webpage;
   parsing the webpage to find therein one or more flags having preselected characteristics;
   when said one or more flags are found, in response to a first received request presenting to said monitor an information label about each of said one or more flags; and
   in response to a second received request, downloading and storing in a toolbars database parameters relative to a selected one of said one or more flags, which parameters enable said toolbar to be morphed into a toolbar with a look-and-feel and functionalities dictated by said parameters, which constitutes an instantiation of said toolbar.

13. The method of claim 12 where said preselected characteristic is an identifier that constitutes, or is included in a webpage element.

14. The method of claim 12 where said preselected characteristic is a webpage element that constitutes, or includes, an identifier that is included in a list maintained by the toolbar.

15. The method of claim 13 where said identifier comprises a domain name.

16. The method of claim 12 where said second request identifies a label selected from the labels presented to said monitor.

17. The method of claim 12 where the parameters are obtained from a pre-specified server, from a server specified by a string associated with said selected one of said one or more flags, or from information in said webpage that is associated with said selected one of said one or more flags.

18. The method of claim 12 where said parameters control look-and-feel and/or functionalities of said toolbar.

19. The method of claim 12 further comprising the steps of:
   in response to a third request, displaying on said monitor toolbar instantiations contained in said toolbars database; and
   in response to a selection of one of said toolbar instantiations,
      retrieving from said toolbars database parameters associated with said selected one of said toolbar instantiations; and
      morphing the toolbar in accordance with the retrieved parameters.

20. The method of claim 12 further comprising the steps of:
   based on a preselected algorithm, accessing a server for the purpose of obtaining a collection of flag characteristics to be employed by said step of parsing; and
   storing the obtained collection.

21. The method of claim 20 where said accessing is carried out substantially periodically, or each time the browser's execution is initiated.

* * * * *

UNITED STATES PATENT AND TRADEMARK OFFICE
CERTIFICATE OF CORRECTION

| | | |
|---|---|---|
| PATENT NO. | : 7,814,424 B2 | Page 1 of 1 |
| APPLICATION NO. | : 11/823144 | |
| DATED | : October 12, 2010 | |
| INVENTOR(S) | : Ronen Shilo | |

It is certified that error appears in the above-identified patent and that said Letters Patent is hereby corrected as shown below:

On the title page, item [73] should include an Assignee name that specifies:

Assignee: Conduit, Ltd.

Signed and Sealed this
Fifth Day of July, 2011

David J. Kappos
*Director of the United States Patent and Trademark Office*